United States Patent [19]

Jeter

[11] E Re. 29,526

[45] Reissued Jan. 31, 1978

[54] DIRECTIONAL DRILLING APPARATUS

[76] Inventor: John D. Jeter, 5952 Royal Lane, Suite 254, Dallas, Tex. 75230

[21] Appl. No.: 435,413

[22] Filed: Jan. 22, 1974

Related U.S. Patent Documents

Reissue of:

[64] Patent No.: 3,637,032
Issued: Jan. 25, 1972
Appl. No.: 4,943
Filed: Jan. 22, 1970

U.S. Applications:

[63] Continuation-in-part of Ser. No. 869,056, Oct. 24, 1969, abandoned.

[51] Int. Cl.[2] ..... E21B 7/06
[52] U.S. Cl. ..... 175/73; 175/61
[58] Field of Search ..... 175/73–76, 175/61, 26, 50, 45, 40

[56] References Cited

U.S. PATENT DOCUMENTS

| | | | |
|---|---|---|---|
| 3,068,946 | 12/1962 | Frisby et al. | 175/73 |
| 3,098,534 | 7/1963 | Carr et al. | 175/73 |
| 3,141,512 | 7/1964 | Gaskell et al. | 175/73 X |
| 3,196,959 | 7/1965 | Kamerer | 175/73 |
| 3,243,001 | 3/1966 | Vincent | 175/73 |
| 3,298,449 | 1/1967 | Bachman et al. | 175/76 |
| 3,465,834 | 9/1969 | Southworth | 175/73 |
| 3,526,285 | 9/1970 | Adkins et al. | 175/73 |
| 3,554,302 | 1/1971 | Adkins | 175/73 X |

*Primary Examiner*—Ernest R. Purser
*Assistant Examiner*—Richard E. Favreau
*Attorney, Agent, or Firm*—Jennings B. Thompson

[57] ABSTRACT

A pendulum is mounted in the drill pipe close to the drill bit to assume a vertical position in the azimuthal plane of the drill pipe. When the position of the pendulum is such that the inclination of the drill pipe is not a preselected amount or the azimuthal direction of the pipe is not the preselected direction, a lateral force is imposed on the drill bit urging it to drill in a direction that will return the drill pipe to said preselected inclination or azimuthal direction. The pendulum and its associated apparatus is rotated in the direction opposite the direction that the drill pipe is rotated and at the same speed, so that the pendulum is substantially nonrotative relative to the earth.

26 Claims, 33 Drawing Figures

FIG. 1
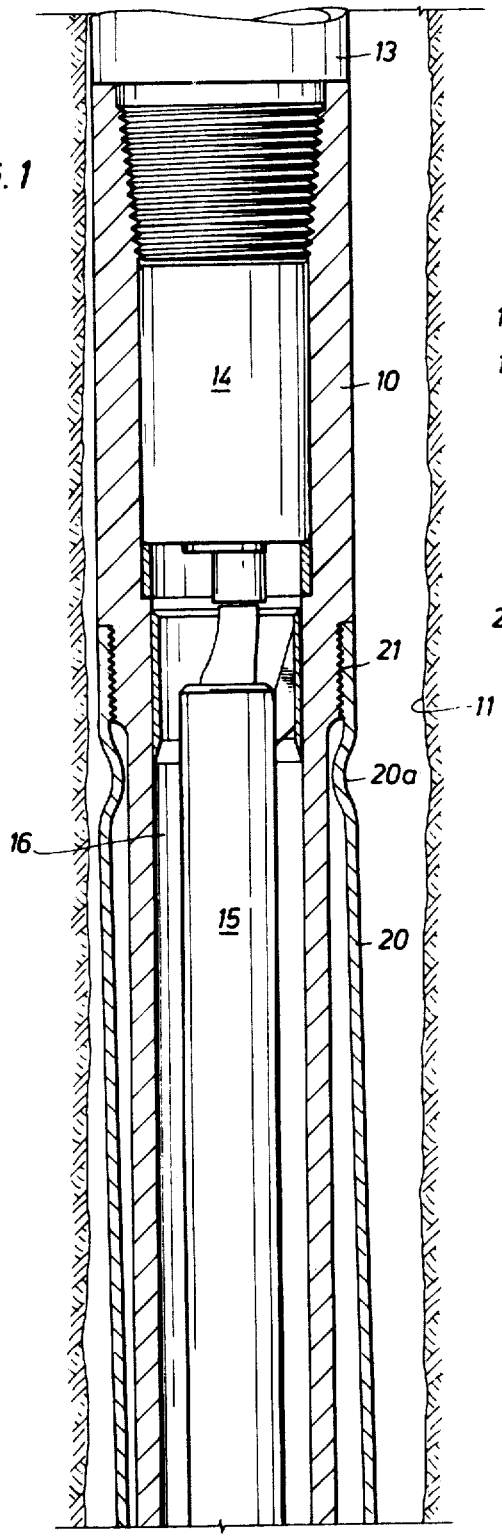
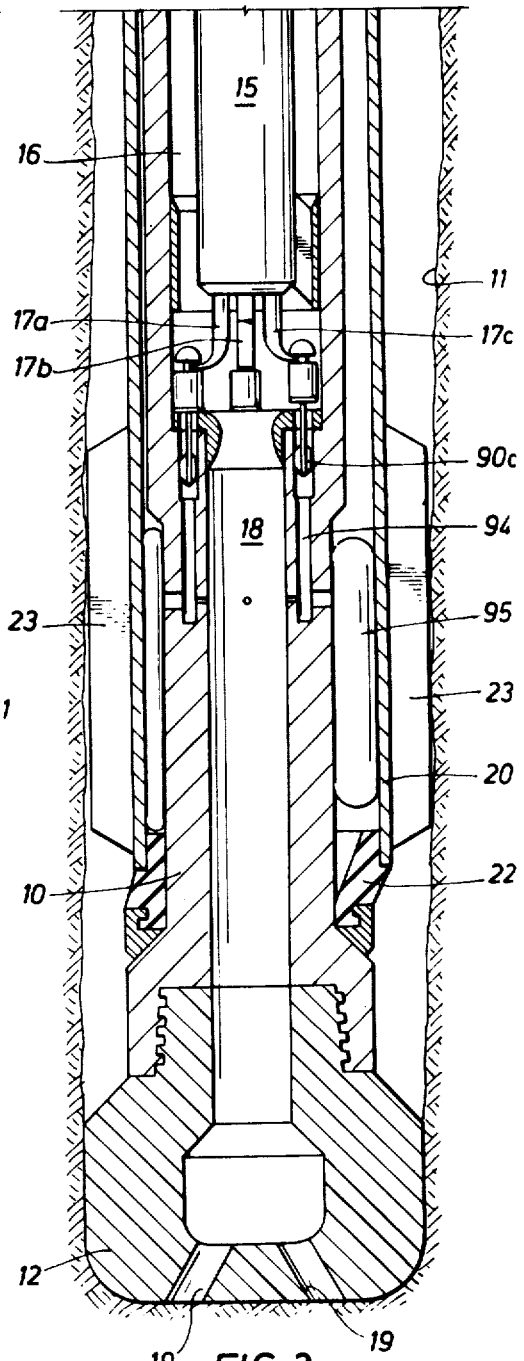
FIG. 2

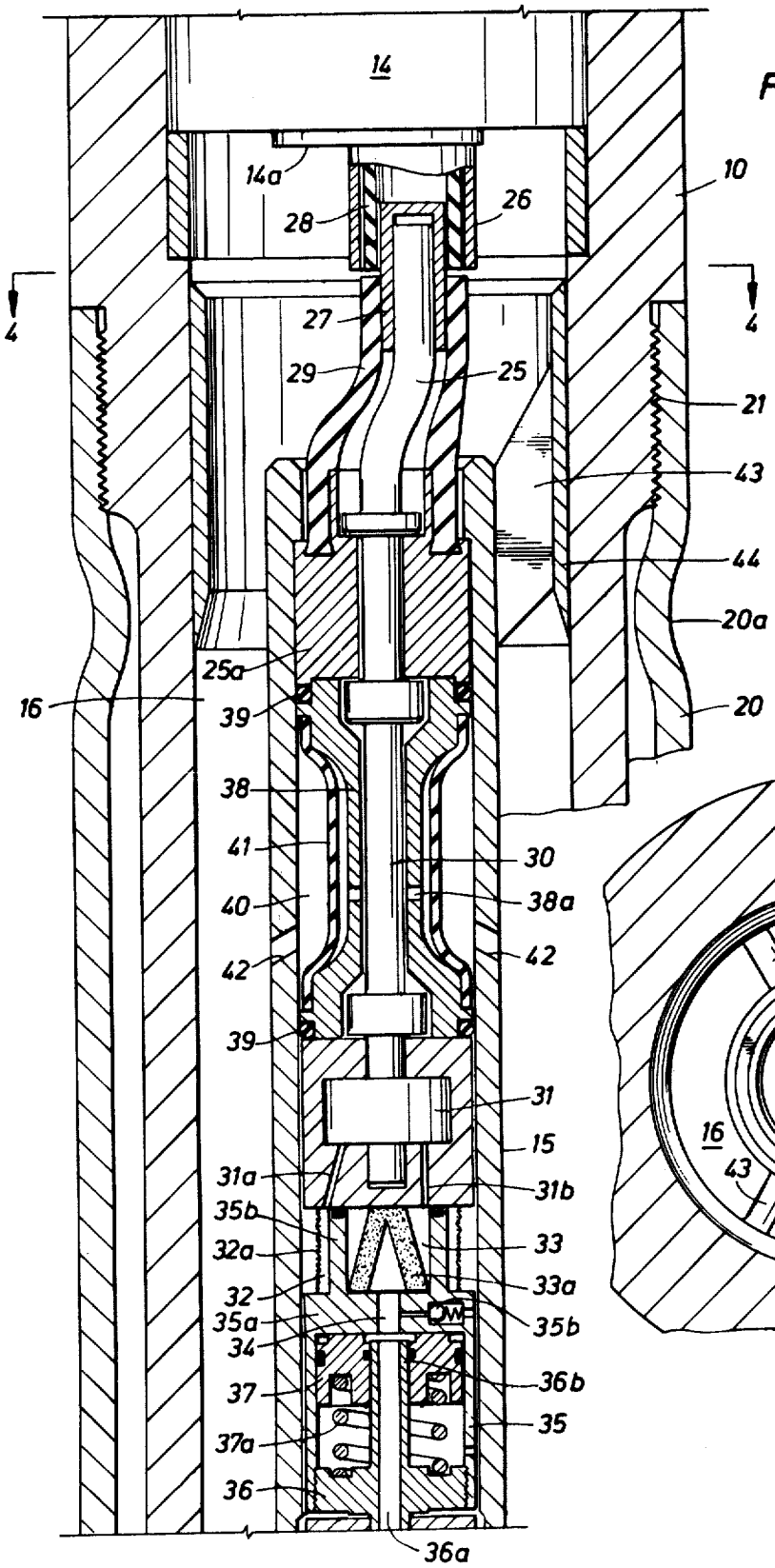
FIG. 3
FIG. 4
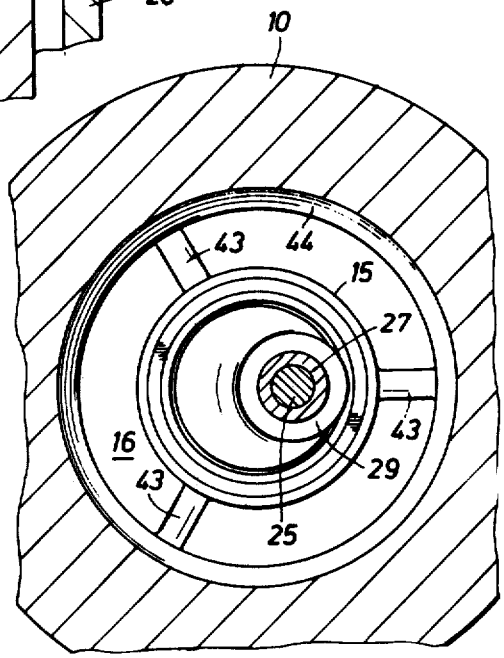

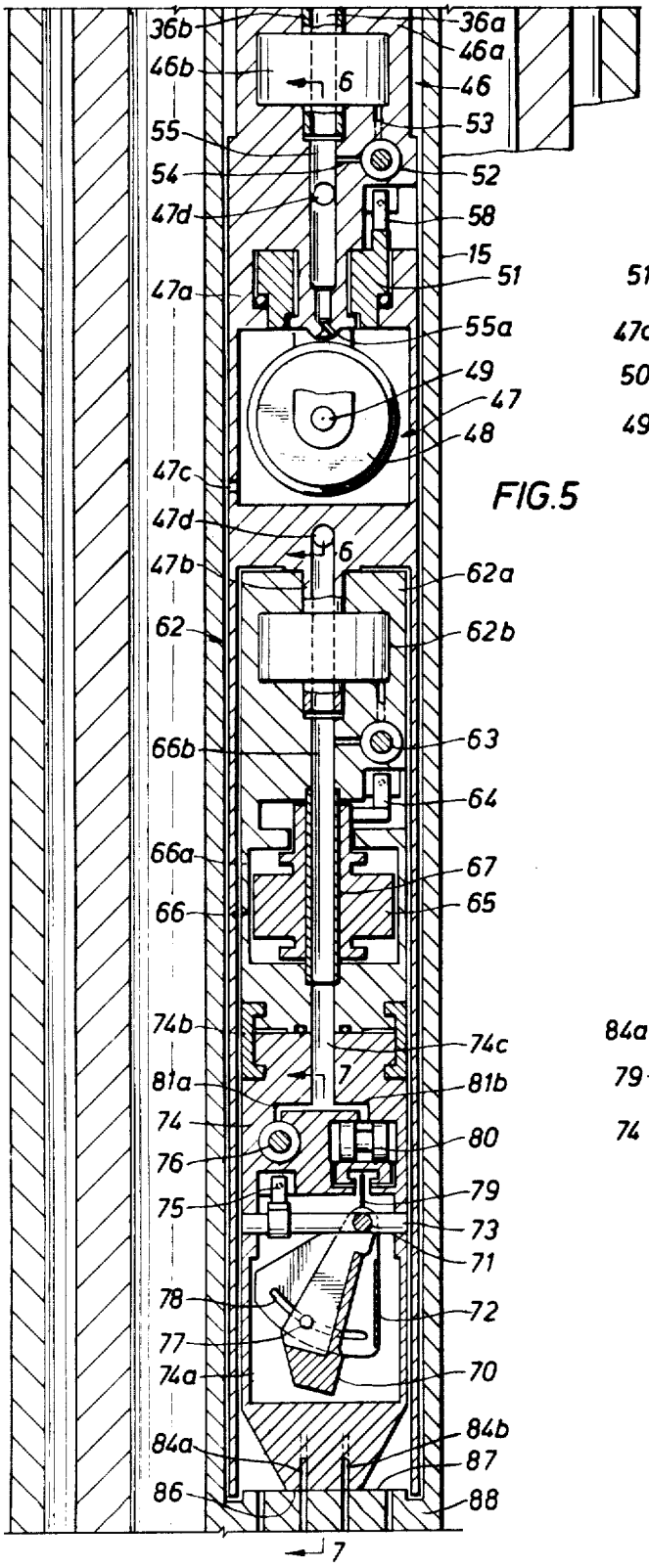
FIG.5
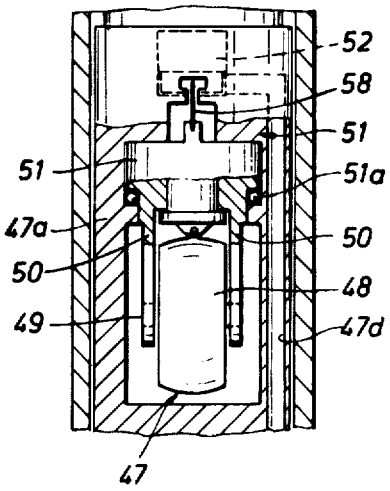
FIG. 6
FIG. 7
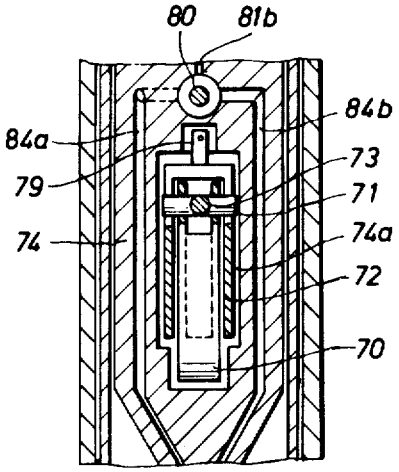

FIG. 8
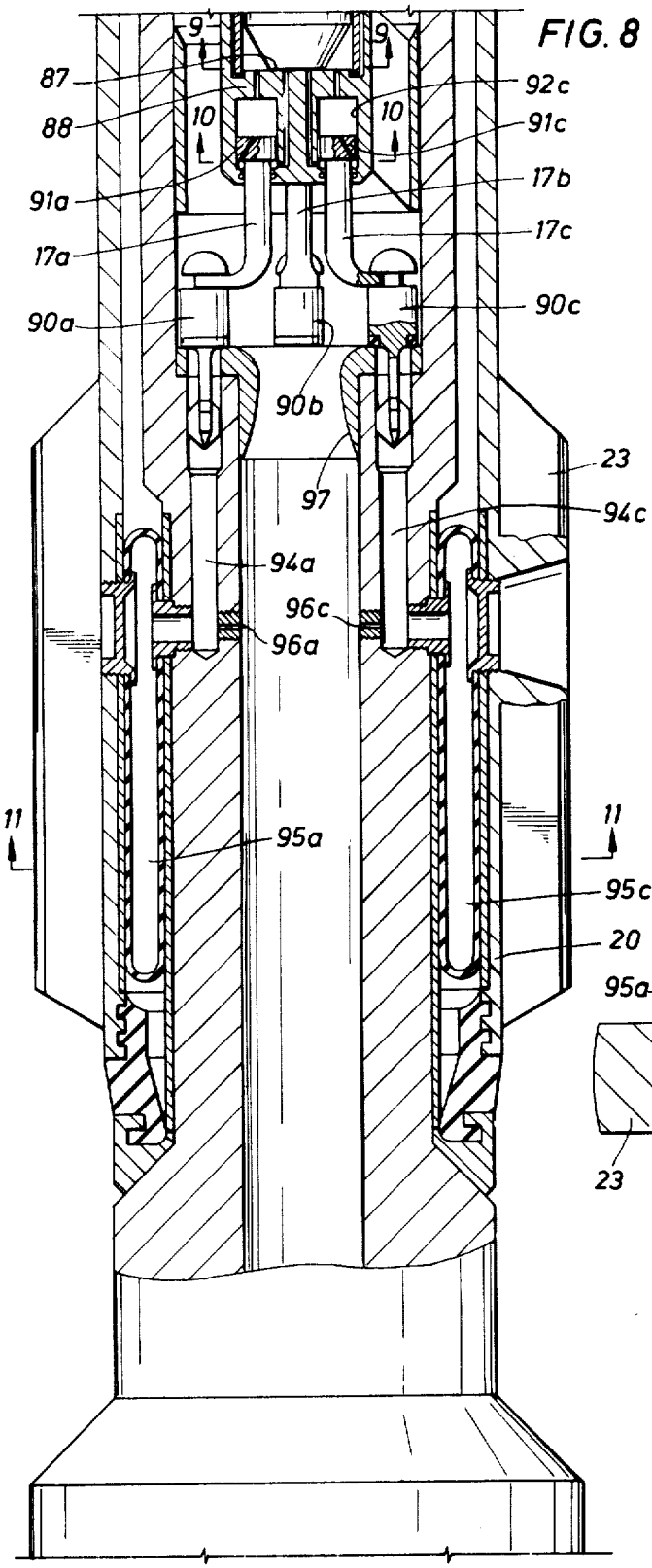
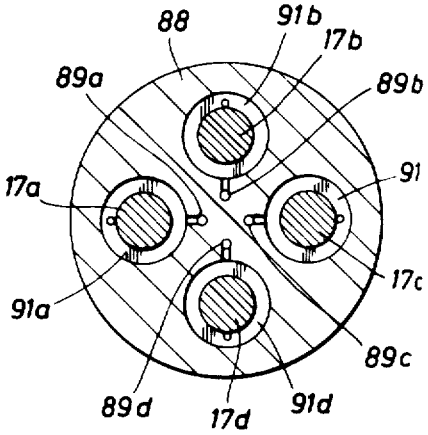
FIG. 10
FIG. 11
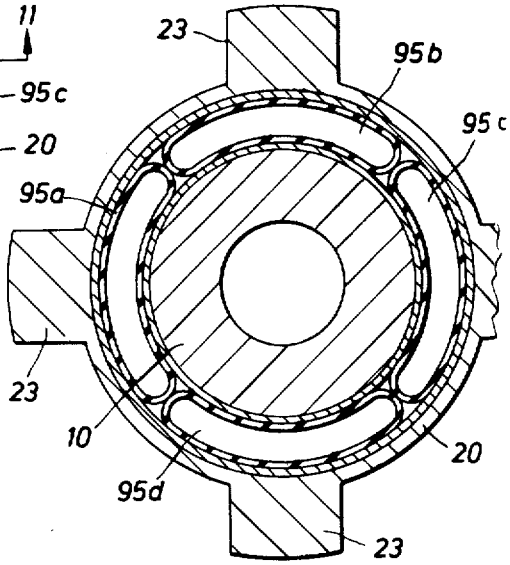

FIG. 14
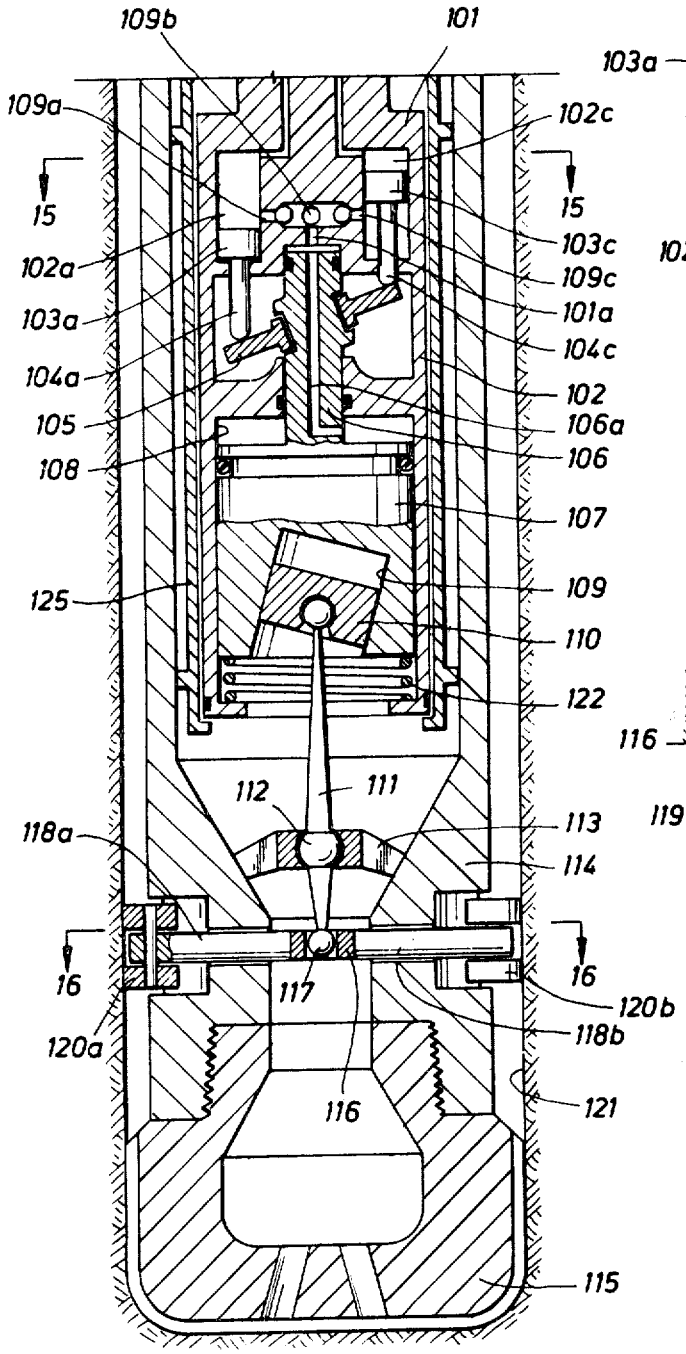
FIG. 15
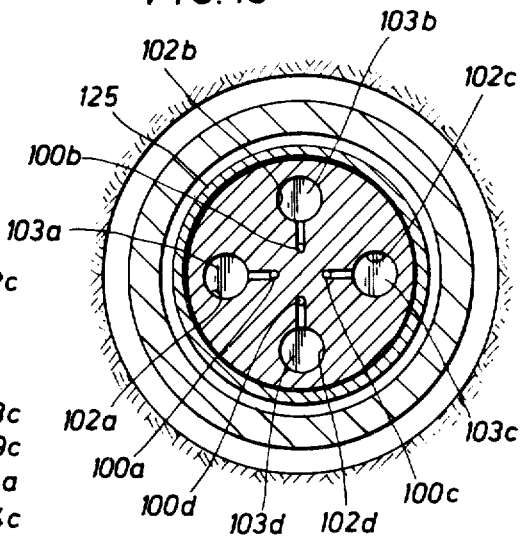
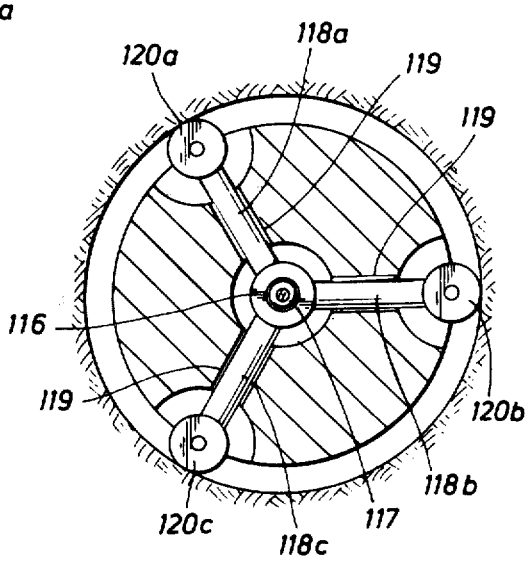
FIG. 16

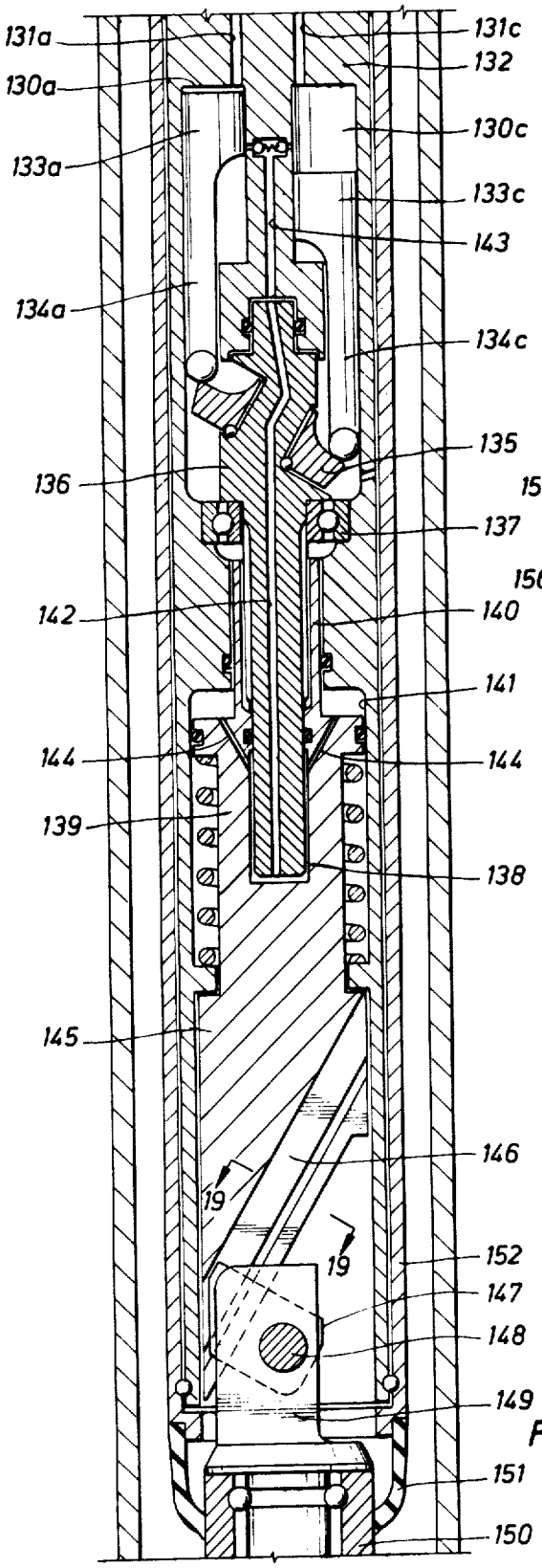
FIG. 17A
FIG. 17B
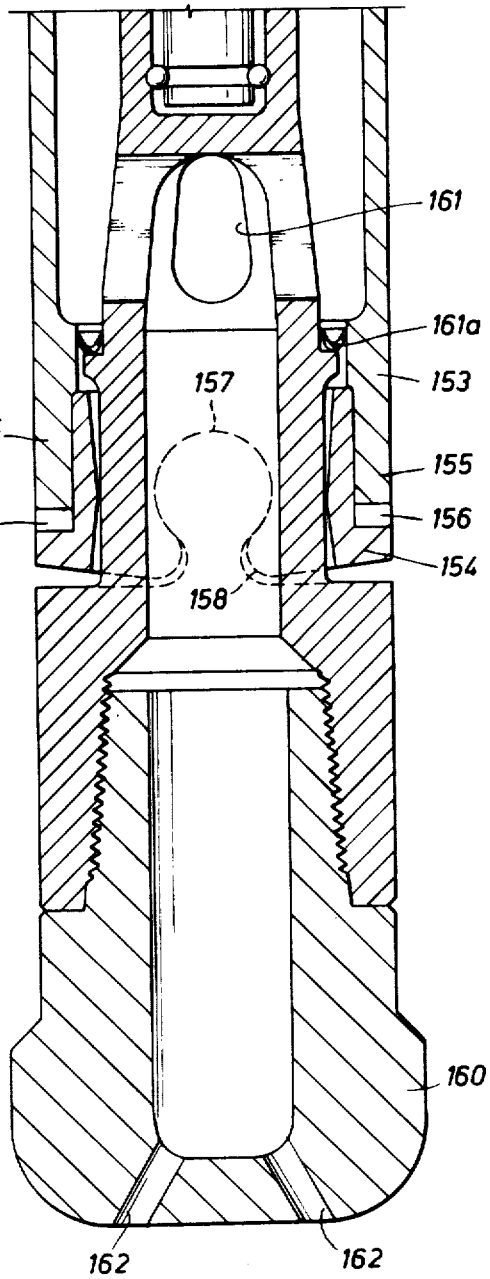

FIG. 19
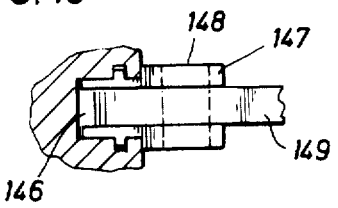
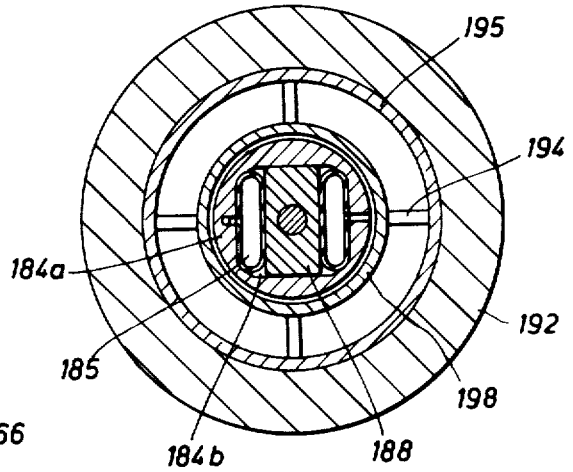
FIG. 22
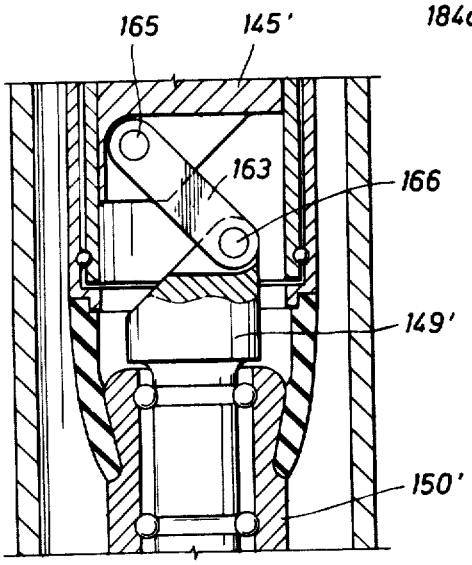
FIG. 20
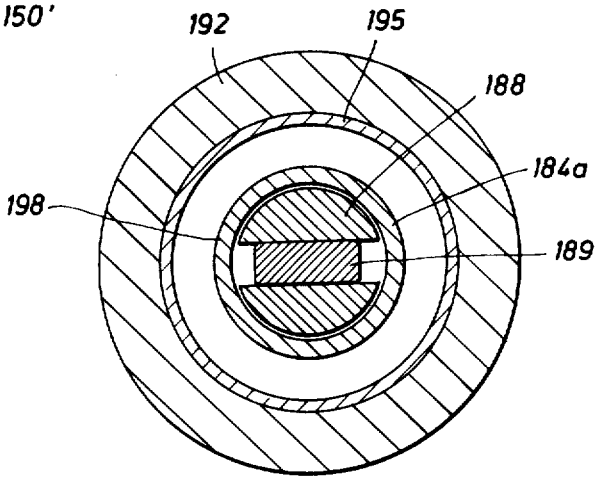
FIG. 23
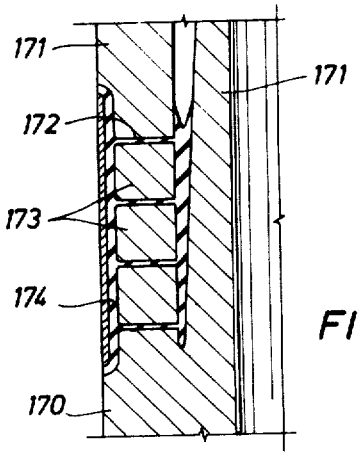
FIG. 21

FIG. 24
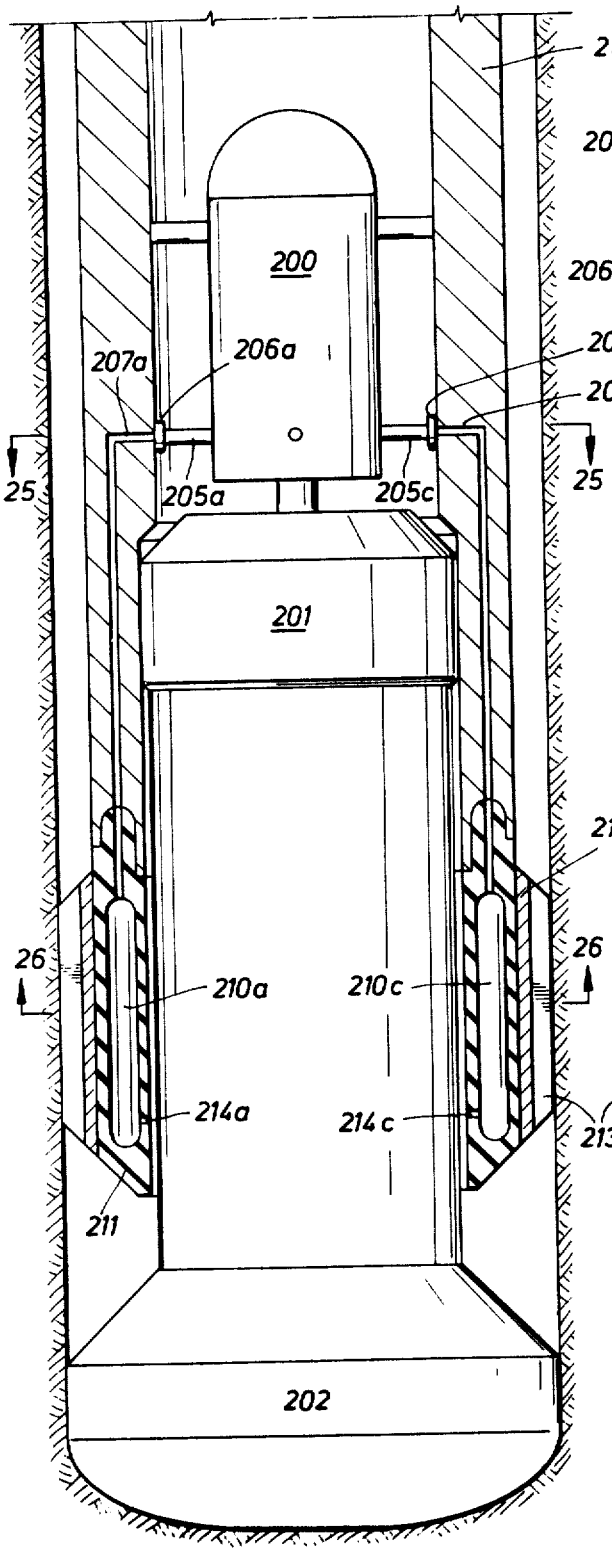
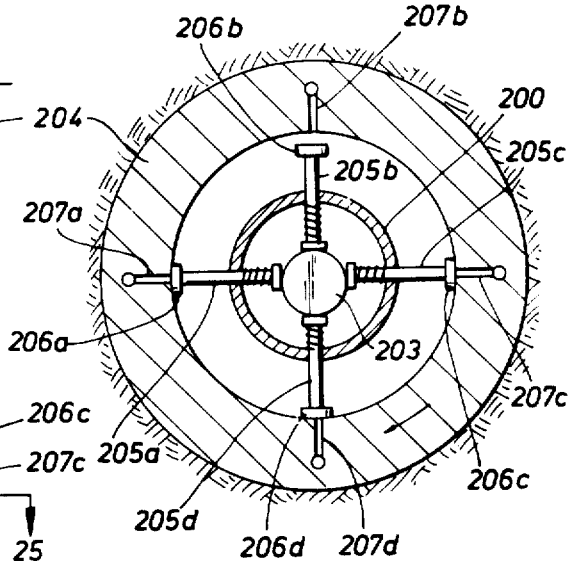
FIG. 25
FIG. 26
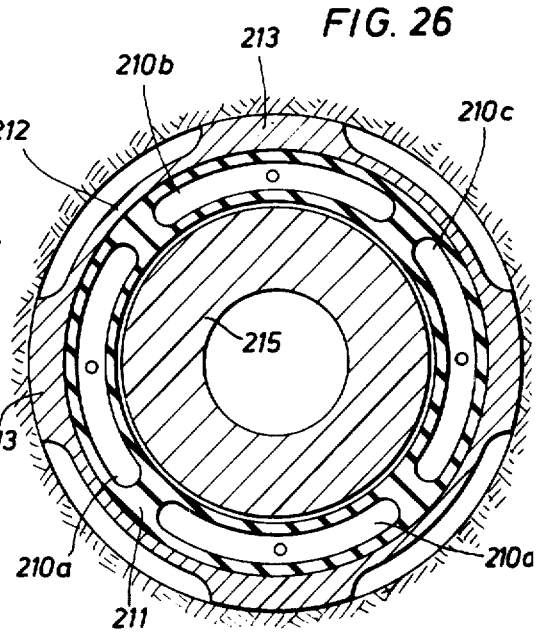

FIG. 27
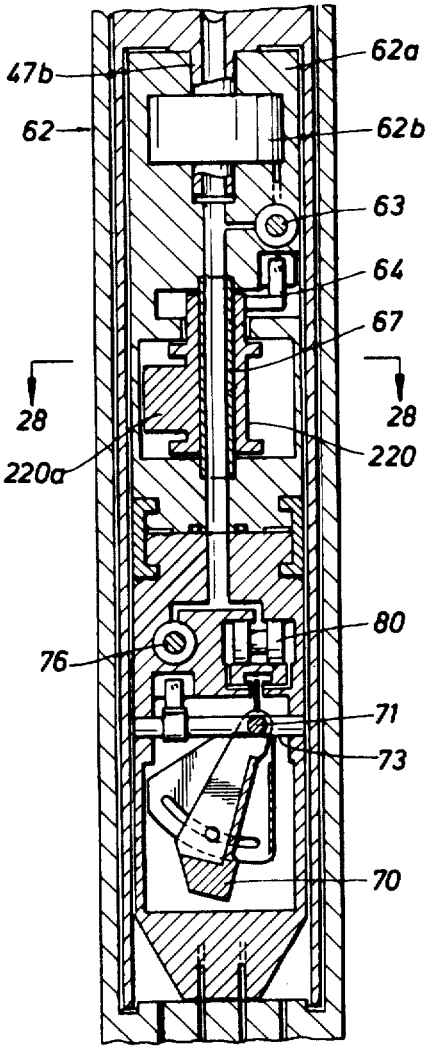
FIG. 28
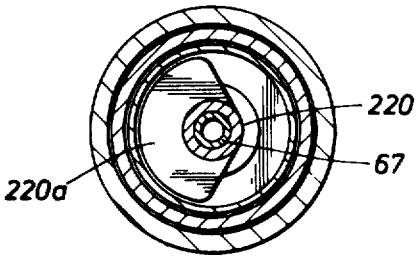
FIG. 29
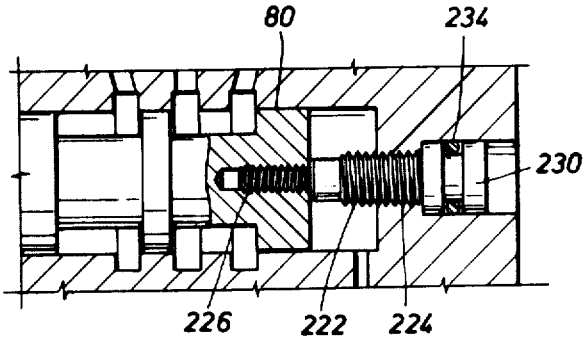
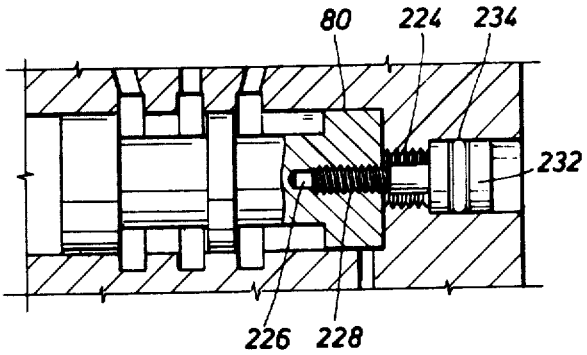
FIG. 30

DIRECTIONAL DRILLING APPARATUS

Matter enclosed in heavy brackets [ ] appears in the original patent but forms no part of this reissue specification; matter printed in italics indicates the additions made by reissue.

This is a continuation-in-part of U.S. Pat. application Ser. No. 869,056, filed Oct. 24, 1969, and entitled "Directional Drilling Apparatus," now abandoned.

This invention relates generally to directional drilling apparatus. In one of its aspects, the invention relates to directional drilling apparatus that urges the drill bit to drill through the earth at a preselected inclination or angle. In another of its aspects, the invention relates to directional drilling apparatus that urges a drill bit to drill through the earth in a preselected compass or azimuthal direction.

Inclinometers that are located in the drill string in the proximity of the drill bit usually include a vertical seeking element, such as a pendulum or plumb bob type member. Such a member gives a reference position from which the inclination of the drill pipe can be measured or sensed. Also, where apparatus is provided for measuring the compass direction a well bore is taking, a north seeking member, such as the needle of a magnetic compass, usually is used to provide a vertical reference plane from which the azimuthal direction the hole is taking can be measured or sensed. Both the inclinometers and the azimuthal direction apparatus of this type are affected by rotation. At the normal rotating speeds at which most drilling operations are performed, this type apparatus will not function properly.

Therefore, it is an object of this invention to provide directional drilling apparatus for positioning in the drill pipe that will remain substantially stationary relative to the earth as the drill pipe is rotated.

It is another object of this invention to provide directional drilling apparatus that includes an inclinometer with a vertical seeking member and an azimuth indicating device with a magnetic north seeking member both of which can function to seek the vertical and the north even though the drill pipe in which they are located is rotated at speeds normally used for drilling.

It is another object of this invention to provide directional drilling apparatus for positioning in the drill pipe having inclination and compass direction sensing devices that are rotated at a speed substantially equal to the speed of rotation of the drill pipe, but in the opposite direction, so the sensing devices will be substantially non-rotative relative to the earth.

It is another object of this invention to provide directional drilling apparatus that indicates the inclination of the drill pipe adjacent the bit and the compass direction the drill pipe is taking and, when either of these departs from a preselected angle or direction, provides corrective signals that cause lateral forces to be imposed on the drill bit to urge the drill bit to drill through the earth at the preselected angle of inclination and in the preselected compass direction.

It is another object of this invention to provide directional drilling apparatus that will exert a lateral force to urge the drill bit to drill through the earth in a direction that will return the drill pipe to a preselected inclination on a preselected azimuthal direction without interfering with the normal rotation of the drill bit.

It is another object of this invention to provide directional drilling apparatus that will urge the drill bit to drill either at a preselected angle or a preselected azimuthal direction and that can be adapted to so function both where the drill pipe rotates the drill bit and where the drill bit is rotated by a downhole motor.

These and other objects, advantages, and features of this invention will be apparent to those skilled in the art from a consideration of this specification, including the attached drawings and appended claims.

FIGS. 1 and 2 are vertical cross sectional views of the upper and lower portions of an embodiment of the apparatus of this invention located in a string of drill pipe just above the drill bit, with the instrument housing and fluid motor portion of the apparatus shown in elevation;

FIG. 3 is a vertical sectional view on an enlarged scale of substantially the same portion of the apparatus that is shown in FIG. 1 with the instrument housing shown in vertical section;

FIG. 4 is a cross sectional view taken along line 4—4 of FIG. 3;

FIG. 5 is a vertical sectional view on an enlarged scale of the portion of the instrument housing below the portion shown in section in FIG. 3;

FIG. 6 is a sectional view taken along line 6—6 of FIG. 5;

FIG. 7 is a sectional view taken along line 7—7 of FIG. 5;

FIG. 8 is a view on an enlarged scale of the lateral force producing portion of the apparatus of FIG. 2;

FIG. 10 is a sectional view taken along line 10—10 of FIG. 8;

FIG. 11 is a sectional view taken along line 11—11 of FIG. 8;

FIG. 14 is a vertical sectional view of another embodiment of lateral force imposing apparatus;

FIG. 15 is a cross sectional view taken along line 15—15 of FIG. 14;

FIGS. 16 is a cross sectional view taken along line 16—16 of FIG. 14;

FIG. 17A and FIG. 17B are vertical sectional views through another embodiment of apparatus for imposing a lateral force on the drill bit;

FIG. 19 is a sectional view taken along line 19—19 of FIG. 17A;

FIG. 20 is an alternate arrangement of a portion of the apparatus of FIG. 17A;

FIG. 21 is an alternate arrangement for a universal connection between the bit sub and the drill pipe;

FIG. 22 is a sectional view taken along line 22—22 of FIG. 18A;

FIG. 23 is a sectional view taken along line 23—23 of FIG. 18A;

FIG. 24 is a vertical sectional view through the lower end of a string of drill pipe with an alternate embodiment of the apparatus, partly in section and partly in elevation, adopted for use with a downhole drilling motor;

FIG. 25 is a sectional view taken along line 25—25 of FIG. 25;

FIG. 26 is a sectional view taken along line 26—26 of FIG. 24;

FIG. 27 is a cross sectional view similar to the lower portion of FIG. 5 of an alternate embodiment of the invention adapted to control only the inclination of a well bore;

FIG. 28 is a sectional view taken along line 28—28 of FIG. 27;

FIG. 29 is a partial sectional view of a portion of the spool of a two-way control valve such as shown in FIG. 12B modified to hold the spool in a given position; and FIG. 30 is a view similar to FIG. 29 with the spool held in another position.

Figure 12A:
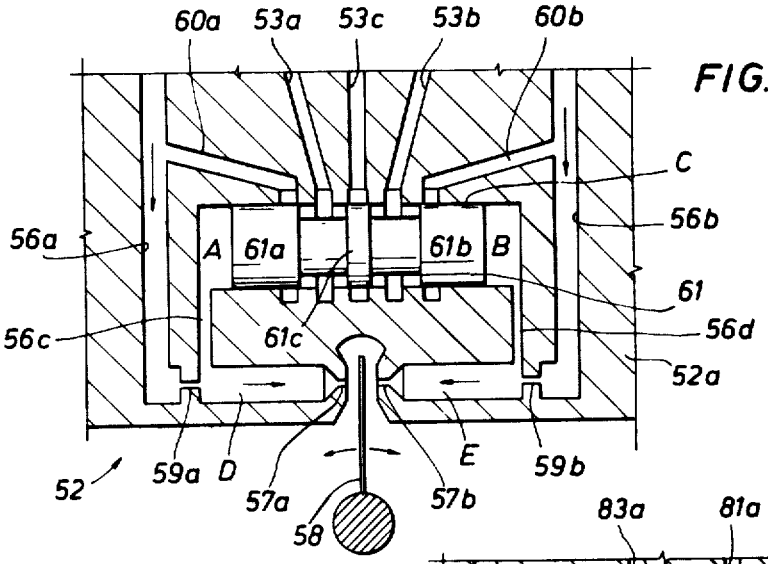
FIGS. 12A and 12B are sectional views through the four-way and two-way control valves, respectively, employed in the embodiment shown.

The embodiment of the apparatus shown in FIGS. 1–11 is adapted for use in conventional drilling practice where the drill pipe string is rotated to rotate the drill bit connected to the string at the bottom.

Referring first to FIGS. 1 and 2, section 10 of the drill string, with drill bit 12 attached to the lower end thereof, is positioned in well bore 11. Section 10 is shown as one member. It is understood, however, that the member in the actual embodiment of the apparatus will probably comprise several tubular members connected together with threads to facilitate the manufacturing and assembling of the apparatus. This is also true of other members of the apparatus. Two or three members may be shown for convenience in the drawings as integrally connected together, but it is to be understood that again for purposes of manufacture and assembly, plus good engineering practice, the members in the actual embodiment will probably comprise several separate members connected together in any convenient manner.

Section 10 is connected to the next joint above, joint 13, with a conventional threaded tool joint connection. As is well known, a plurality of these joints are connected together to make up the drill string. Joint 13 will likely be a drill collar, i.e., a section of pipe that is used to provide weight for urging drill bit 12 to drill through the earth. "Drill pipe" and "drill string" are used interchangeably herein when referring to the entire assembly of pipe that is connected together to extend from the surface to the bottom of the hole being drilled.

Means are provided to supply power to the apparatus. In the embodiment shown, fluid motor 14 is located in the upper end of section 10 of the drill pipe. The motor is driven by the drilling mud that is pumped down through the drill pipe and is in the nature of a turbine. The power produced by motor 14 is transmitted to the apparatus located in instrument housing 15 and is used in a manner to be described below. The drilling fluid that is discharged from motor 14 passes through annulus 16 between instrument housing 15 and the inside of drill pipe section 10. A plurality of arms or lift rods 17 extend out of the lower end instrument housing 15 for purposes that will also be described below. The mud travels between these arms back into central bore 18 of drill pipe section 10 and is discharged through ports 19 of drill bit 12.

Extending over a portion of drill pipe section 10 is outer sleeve 20. This sleeve is connected at its upper end to section 10 by threads 21. At its lower end, it is connected to section 10 by annular ring 22 of resilient elastomeric material such as rubber. Ring 22 provides a seal between the lower end of sleeve 20 and drill pipe section 10 while allowing the lower end of sleeve 20 to shift laterally relative to the drill pipe. Attached to and circumferentially spaced around the outer surface of sleeve 20, adjacent its lower end, are longitudinally extending ribs 23. The outer surfaces of the ribs are adjacent or close to the surface of well bore 11. Shifting the lower end of sleeve 20 laterally will force the ribs into engagement sequentially with the well bore and cause a lateral force to be exerted on the drill pipe just above drill bit 12. This lateral force will tend to force the drill to drill in the direction of the lateral force.

Sleeve 20 has inwardly curved section 20a adjacent threads 21 to permit the desired lateral movement of the lower end of the sleeve without producing excessively high stresses in the sleeve.

Located in instrument housing 15 are devices for sensing the inclination and azimuthal direction being taken by the drill bit. In accordance with this invention, means are provided for rotating these sensing means at approximately the speed of rotation of the drill pipe and in the opposite direction to keep the sensing means substantially non-rotative relative to the earth. In the embodiment shown, (FIG. 3) output shaft 14a of fluid motor 14 drives crank 25 through cylindrical member 26, which is eccentrically mounted on the output shaft. Bearing sleeve 27 extends over the end of crank 25 and is rotatably supported by bearing 28 in member 26. Preferably, crank 25 and member 26 rotate relative to bearing sleeve 27 so that it will not rotate but will gyrate about the centerline of the apparatus. This allows a mud seal to be established between sleeve 27 and instrument housing 15 by flexible rubber boot 29 and no rotating seals are required. Boot 29 has one end bonded to the bearing sleeve and the other to crank shaft bearing 25a located in the upper end of the housing.

Crank 25 rotates shaft 30, which drives oil pump 31. The unoccupied inner volume of instrument housing 15 is filled with hydraulic fluid. Hydraulic fluid is drawn into the pump through inlet opening 31a from suction chamber 32. Annular screen 32a filters the oil entering the pump. The oil is discharged through outlet port 31b into chamber 33. Annular flange 35b extends upwardly from head 35a to form chambers 32 and 33.

The oil passes through filter screen 33a and port 34 in cylinder head 35a into cylinder 35. The hydraulic fluid can flow out of cylinder 35 through opening 36a of tubular portion 36b of lower cylinder head 36 to reach the apparatus below. The pump is sized so that it will furnish more hydraulic fluid under pressure than is required. Therefore, to let the pump run continuously while mud is being circulated, the hydraulic fluid fills the cylinder above piston 37 and urges the piston downward against coil spring 37a. The cylinder, piston, and spring act as an accumulator to maintain a supply of hydraulic fluid under pressure that is available as needed by the apparatus. At a given pressure in the cylinder, check valve 38 in cylinder head 35a will open and discharge excess fluid from the pump back to suction chamber 32.

Above the hydraulic pump, drive shaft 30 passes through tubular spool-shaped member 38. Seals 39 located at opposite ends of the spool between the outside surface of member 38 and the inside surface of instrument housing 15 isolate annular space 40 around the outside of the spool and the hydraulic fluid in the housing. Sleeve 41 of flexible material encloses the outside surface of member 38 with each end in sealing engagement with the spool-shaped member. The outside of the sleeve is exposed to drilling fluid that enters housing 15 and annular space 40 through ports 42. The inside of the sleeve is exposed to the hydraulic fluid in the housing through ports 38a. Sleeve 41 acts as a diaphragm between the drilling fluid and the hydraulic fluid inside instrument housing 15 to maintain the pressure of these two fluids the same and relieve instrument housing 15 of any pressure differentials existing across it due to the hydrostatic pressure of the drilling mud in which it is located.

As shown in FIG. 4, instrument housing 15 is centrally positioned inside drill pipe section 10 by radially extending ribs 43 and annular ring 44. Ribs 43 connect ring 44 with housing 15 and the outside diameter of ring 44 is such that it fits closely inside of drill pipe section 10.

Referring now to FIG. 5, hydraulic fluid from the pump flows through port or passgeway 36a of tubular portion 36b and through rotor 46b of fluid pacing motor 46. Rotor 46b and stator 46a of the motor are shown schematically in the drawings for simplicity. Any fluid motor can be used.

In the embodiment shown, rotor 46b is attached to or connected to tube 36a and cylinder head 36, which connects the rotor to housing 15. The housing, as explained above, is connected to drill pipe section 10. Therefore, the drill pipe section and rotor 46b will rotate at the same speed.

Means are provided to control the flow of hydraulic fluid to motor 46 so that stator 46a, which is not attached to the housing, will rotate in the opposite direction from rotor 46b at approximately the same speed that the drill pipe is rotating. The stator then will be substantially non-rotative relative to the earth. In the embodiment shown, gyroscope 47 is positioned below motor 46 in gyroscope housing 47a. The gryoscope has disc or wheel 48 mounted for rotation on shaft 49. Shaft 49, in turn, is supported by parallel arms 50, which are attached to annular member 51. Bearing 51a supports the gyroscope for rotation relative to the gyroscope housing. As shown, gyroscope housing 47a is an integral part of the stator. Thus, rotation of the gyroscope is relative to its housing and to the stator.

In describing motor 46, the outside portion was called the "stator" and the inside or central member the "rotor." This is conventional, however, [since] the [rolls] *roles* of the members could be easily reversed with the outer member becoming the "rotor." In other words the names "stator" and "rotor" are interchangeable.

Means are provided to control the flow of hydraulic fluid to motor 46 to control the speed that the stator rotates relative to the motor. In the embodiment shown, flow control valve 52 serves this purpose. It is mounted in stator 46a and controls the flow of hydraulic fluid from passageway 36a, bore 55 of the stator and gyroscope housing 47a, passageway 54, and motor fluid inlet port 53. The pressure fluid in bore 55 also flows out nozzle 55a at an angle and impinges on the outer surface of gyroscope wheel 48. This surface is roughened or grooved laterally sufficiently for the stream of fluid from the nozzle to cause the wheel to rotate. The fluid used for this purpose is returned through ports 47c to the fluid returning to the fluid pump along side the gyroscope housing.

The remainder of the fluid in bore 55 flows through passageway 47d around the cavity in the housing for the gyroscope into tubular member 47b.

Referring now to FIG. 12A, the structure and operation of flow valve 52 will be described. This valve is what is known as a Moog valve. They are commercially available. Valve 56 includes valve body 52a, which has a plurality of passageways provided therein. The valve body is shown as an integral part of the stator and gyroscope housing. Hydraulic fluid from bore 55 flows through passageways 56a and 56b and is discharged in opposing streams through orifices 57a and 57b, respectively. This fluid also flows through upstream orifices 59a and 59b which restrict the flow of fluid into chambers D and E between each pair of orifices. The opposing fluid streams from orifices 57a and 57b strike valve element 58. This element is attached to annular member 51 and will remain substantially stationary as does the member and the gyroscope. Movement of the stator relative to the gyroscope wll move one of orifices 57a and 57b toward the element, while moving the other away.

If the movement of the stator is to the left as viewed in FIG. 12A, the flat sided-valve control element will move close to orifice 57b and retard the flow of fluid out of chamber E. By moving away from orifice 57a, the flow of fluid through that orifice can increase and the pressure in chamber D will decrease. Openings 56c and 56d connect chambers D and E to chambers A and B, respectively, on opposite sides of cylindrically shaped, valve spool 61 which slides axially into and out of chambers A and B, both of which combine to form one elongated cylindrical chamber C for the valve spool 61.

Passageways 60a and 60b connect passageways 56a and 56b, respectively, to chamber C. As shown, the flow of fluid from these passageways into the chamber is blocked by sections 61a and 61b on spool 61, which have a diameter large enough to provide a sliding seal with the wall of the chamber. Passageways 53a and 53b are connected to motor 46. Fluid flowing through passageway 53a will urge the stator to rotate relative to the rotor in one direction, fluid flowing through passageway 53b will urge relative rotation in the opposite direction. Passageway 53c is connected to the reservoir of hydraulic fluid in the instrument housing.

In operation, when movement of the stator relative to the gyroscope moves valve control element 58 to the right, as explained above, the pressure in chamber A will drop below the pressure in chamber B. Valve spool 61 will move to the left connecting passageways 60a and 53a by positioning the section of the spool with the reduced diameter adjacent the openings of these two passageways. At the same time, this connects passageways 53b from the motor with exhaust port [53a] *53c* by moving the section of reduced diameter between sections 61b and 61c over their openings. Fluid under pressure can now flow to the motor to rotate the stator in a direction to move it back toward the center or neutral position relative to orifices 57a and 57b. Movement of the stator in the other direction will supply pressure fluid to the motor through passageways 60b and 53b and correct relative movement of the stator and gyroscope in the other direction and again move the valve element to the neutral position.

Since probably even in most systems there will be some creep of the gyroscope resulting in some slight rotation of stator 46a relative to the earth, second hydraulic motor 62 is provided in the embodiment shown to reduce the effect of this creep. Motor 62 includes stator 62a and rotor 62b, here again shown more or less schematically in FIG. 5. Rotor 62b is connected to tubular member 47b, which extends downwardly from the lower end of gyroscope housing 47a. Therefore, the rotor will rotate at the same speed as the stator of first pacing motor 46. The speed of rotation of stator 62a relative to rotor 62b is controlled by valve 63, which is a valve like valve 52 described above. Here, however, valve control element 64 is connected to magnetic north seeking member 65 of magnetic compass 66. North seeking member 65 is mounted for rotation relative to stator 62a and compass housing 66a by tubular bearing sleeve 67. The member is preferably made up of a plurality of stacked, permanently magnetized discs arranged with their north and south poles in alignment. North seeking member 65 of the compass will tend to remain stationary relative to the magnetic field and will provide a feed back to the valve to control the speed of stator 62a relative to rotor 62b, which is rotating at the speed that gyroscope 47 and stator 46a of the first pacing motor is rotating. This rotation will be due to inherent creep in the system plus whatever rotation, if any, of stator 46a relative to the earth that the first packing motor cannot prevent. Thus, with two pacing motors in series, stator 62a is substantially non-rotative relative to the earth. If desired, a second gyroscope could be used for this purpose. By using a magnetic compass, however, the magnetic north seeking member of the compass can be used to also provide azimuth sensing means for controlling the compass or azimuthal direction of the well bore, along with its inclination.

In accordance with this invention, inclination sensing means are provided for location in the drill pipe above the bit. In the embodiment shown, the inclinometer includes a vertical seeking member, pendulum 70, that makes an angle with the section of drill pipe in which it is located that is substantially equal to the angle the drill pipe section makes with the vertical. Pendulum 70 is supported by pin or shaft 71, as shown in FIG. 7. Shaft 71, in turn, is supported by the downwardly extending arms of U-shaped quadrant member 72. The pendulum can swing around the longitudinal axis of pin 71. The entire assembly is supported for rotation by second pin or shaft 73, which is perpendicular to shaft 71. It is supported in valve and pendulum housing 74, which has central cavity 74a in which the pendulum is located. Thus, pendulum and U-shaped quadrant member 72 can seek a vertical position by rotating around the longitudinal axis of both shafts.

Valve and pendulum housing 74 is connected to magnetic compass housing 66a so that pendulum 70 can be positioned to swing in a plane that includes the vertical axis of the drill pipe, the longitudinal axis of shaft 73, and the azimuthal direction it is desired for the well bore to be drilled, when the north seeking element is pointing toward magnetic north. For example, if the well bore is to be drilled in a due eastwardly direction, then valve and pendulum housing 74 will be rotated until pendulum 70 will hang in a vertical plane that includes the pendulum and the longitudinal axis of shaft 73, and lies in a due easterly direction, when the compass member is pointing toward magnetic north. Then if the well bore deviates from this azimuthal direction, for example, if it tends to head in a more northerly direction, and we are looking east in FIG. 7, pendulum 70 will rotate around shaft 73 to the left since shaft 73 will be held in a due east position by magnetic north seeking element 65.

Means are provided to produce correction signals whenever the pendulum hangs at an angle other than the preselected angle and when the pendulum swings out of the preselected azimuthal plane. In the embodiment shown, pivotal movement of the pendulum around the axis of shaft 73 will move valve element 75 of control valve 76 and cause fluid under pressure to be supplied to one of its two outlet ports 83a and 83b of FIG. 12B. This valve operates on the same principal as the valve in FIG. 12A, except that it is a two-way rather than a four-way valve. As will be described below, when one of these passageways 83a and 83b is supplied with pressure fluid, a lateral force will be imposed on the drilling bit tending to urge the bit to again drill in an easterly direction.

Split clamp 74b is used to releasably connect the valve and pendulum housing to the compass housing. The clamp can be loosened to allow the relative rotation desired, then tightened to hold the two housings from further relative rotation.

If the well bore begins to vary from its preselected inclination, pendulum 70 will swing either in one direction or the other around the axis of shaft 71. The pendulum is adjustably connected to quadrant member 72 by set screw 77, which extends through the pendulum and arcuate slot 78 in the quadrant. The pendulum is moved to the desired inclination with valve member 79 of control valve 80 zeroed or centered, the lock screw is then tightened down and as long as the inclination of the hole is at the preselected amount, valve 80 will be in its centered or neutral position. If the pendulum swings in one direction or the other around the axis of shaft 71 due to an error in the inclination of the well bore, quadrant member 72 will move valve control member 79, and valve 80 will supply pressure fluid to one of outlet ports 84a or 84b to impose a lateral force on the drill bit to urge the bit to drill in a direction that will return the well bore to the preselected inclination.

Figure 12B:
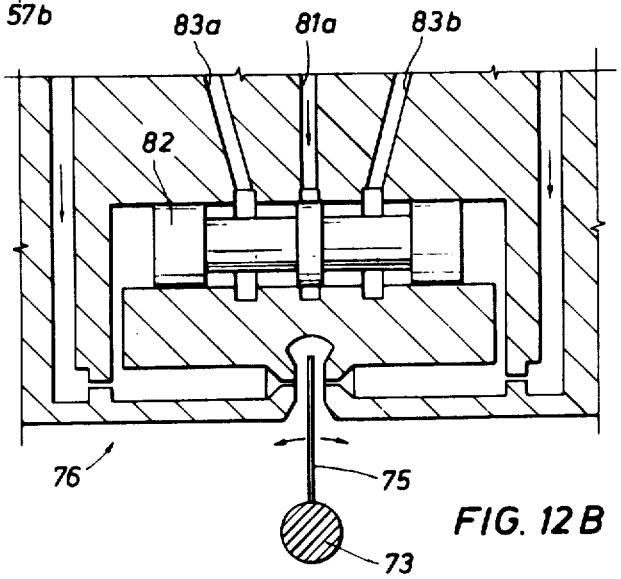

Referring to FIG. 12B, valve 76 is shown in cross section. Passageway 81a is supplied with hydraulic fluid under pressure. Movement of pendulum 70 to the left or right around the axis of shaft 73, as viewed in FIG. 7, will cause spool 82 to shift to the left or right in the same manner as explained above in connection with the valve of FIG. 12B. Movement of the spool to the right will connect passageway 81a and passageway 83a, whereas movement of the spool to the left will supply fluid pressure from passageway 81a to passageway 83b. As will be explained below, one of these passageways will carry a "right" and the other a "left" signal. In other words, they will tend to urge the bit either to the right or the left as required to bring it back into the desired azimuthal plane. The same valve arrangement is used for valve 80, which will supply passageways 84a and 84b with fluid under pressure from passageway 81b, as shown in FIG. 7, to provide and "up" or "down" signal. Fluid under pressure is supplied to passageways 81a and 81b through bore 66b in the compass housing, tubular bearing sleeve 67, and bore 74c of the valve and pendulum housing.

Figure 9:
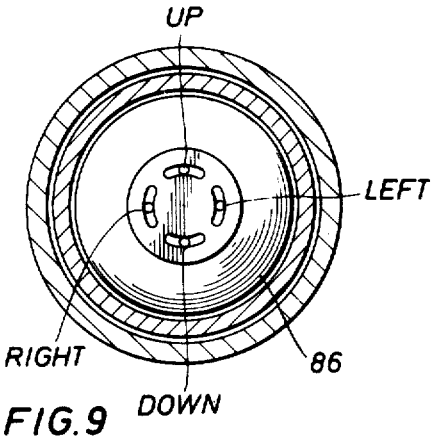
FIG. 9 is a view taken along line 9—9 of FIG. 8.

The four correction signal passageways carrying the "up", "down", "right" or "left" signals travel downwardly through valve and pendulum housing 74 and terminate in outlet ports located in lower flat surface 86 of the housing. Surface 86 is shown in FIG. 9, the four ports are arranged symmetrically around the center of rotation of surface 86. As explained above, each port may carry a pressure signal that will produce a given desired result in the direction taken by the drill bit. The "up" and "down" ports are opposite each other, as are the "right" and "left" ports. Since a pressure signal will be in only one of each of the two related ports at a time, where a combination correction of both inclination and compass direction is required, a combination of pressure signals will be either "up-right", "up-left", "down-right" or "down-left". In each combination, the two ports having fluid pressure on them will be adjacent each other.

In direct rubbing contact with surface 86 is upper surface 87 of instrument housing closure member 88. This member is rotating with the instrument housing at the speed of the drill pipe. It is provided with four ports 89a--89d, as shown in FIG. 10. These ports are located so that they will rotate in the same circle as the pressure signal ports in surface 86. Assume, for example, that fluid pressure is on the "left" port on surface 86 then, with each quarter of a revolution of the drill pipe, one of ports 89a-89d will be pressurized by the fluid pressure in this port. To allow more time for the fluid pressure to move the pistons, etc., arcuate grooves that include the pressure signal ports can be provided as shown in FIG. 9.

As each of ports 89a-89d is pressurized, the fluid pressure in the ports will in turn lift its associated valve member 90a-90d (FIG. 8). The valves are opened by the upward movement of pistons 91a-91d and their associated rods 17a-17d as each of ports 89a-89d is supplied with pressure fluid. For example, in FIG. 2, valve 90c has been opened by rod 17c. This allows mud pressure to flow through passageway 94c (FIG. 8) into pressure energized, force transmitting member 95c. In the embodiment shown, this member is an elongated bladder made of elastomeric material, such as rubber, which will transmit the pressure of the mud laterally between drill pipe section 10 and sleeve 20. This will cause sleeve 20 and lateral abutment 23 adjacent bladder [54c] *95c* to push against the side of well bore 11 and, in turn, push laterally against drill pipe 10 above the bit to urge the bit to move to the left, as viewed in the drawings. As soon as the first energized port 89 has passed out of reach of the particular port or ports, "right", "up", "down", or "left", having pressure fluid in them, valve 90c will close and the mud in bladder 94c will bleed into the drill pipe through orifice 96c. This orifice is sized to allow the bladder to deflate rapidly when the flow of mud into the bladder is stopped, but to retard the escape of mud sufficiently to allow the bladder to be inflated when the mud valve is open.

The return of the mud to the drill pipe is encouraged by venturi 97, which is located upstream of orifices 96. This, the pressure downstream of the venturi should be somewhat less than the pressure upstream and the mud in the bladders should readily flow back into the drill pipe. The resilient force imposed on the bladders by sleeve 20 attempting to return to its central position will also help deflate each bladder after its associated inlet valve is closed.

As each of ports 89 moves under the one or two ports in surface 86 that contain fluid pressure, each of the bladders, in turn, will be inflated and exert their lateral forces on the drill pipe. If two ports are provided with a pressure signal then two adjacent bladders will be inflated at the same time and the resulting lateral force will lie between them.

Figure 13:
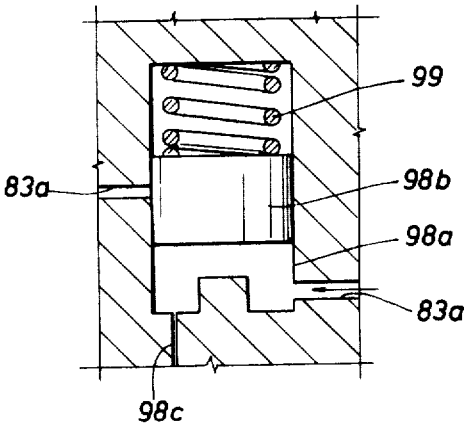
FIG. 13 is a sectional view through an averaging device employed in the embodiment shown.

To avoid spurious pressure signals from the sensing apparatus, an averaging device, such as shown in FIG. 13, may be used with each pressure signal passageway. The passageway, for example passageway 83a, is connected into cylindrical space 98a in body 98. Piston 98c in the cylindrical space must move up to uncover the continuation of passageway 83a on the other side of the body. Spring 99 resists this and can be selected to cut off all pressure signals except those that last long enough to build up sufficient pressure to compress the spring. Bleed port 98c keeps the pressure from building up in the device due to leaks past the valve.

FIGS. 14-16 show an alternate arrangement for providing the lateral force in response to the pressure signals produced by the apparatus described above. In this embodiment the four fluid pressure signals, "up", "down", "right", and "left" are transmitted directly to the force producing apparatus through passageways 100a-100d in cylindrical member 101. This member closes the upper end of cylinder housing 102 and is connected to the pendulum housing of the apparatus above (not shown). It, therefore, is earth oriented and substantially non-rotative. Instrument housing 125 does rotate with the drill pipe. Each of passageways 100a-100d extend into the member and are connected to cylinders 102a-102d, respectively. Pistons 103a-103d are located in cylinders 102a-102d, respectively. Piston rods 104a-104d are connected to pistons 103a-103d and engage swash plate 105. The swash plate is mounted at an angle on shaft 106. A downward force exerted by one of rods 104a will orient swash plate 105 with its low side under that piston rod and in this manner orient shaft 106. Thus, when a pressure signal is supplied to one of passgeways 100a-100d, this pressure will enter the associated cylinder and exert a downward force on the piston therein. The piston will move down and through its attached rod exert a downward force on the swash plate causing it to rotate shaft 106 until the swash plate is at its lowest point below this particular piston rod. If two of the pressure ports are supplied with a pressure signal, such as in the case of an "up-right" or similar combination corrective signal, then two adjacent piston rods will exert a downward force on swash plate 105 and the swash plate's low point will be located between these two piston rods and it will orient the shaft in the proper direction for providing the desired lateral force to provide the combined corrections, as will be explained below.

Connected to shaft 106 is piston 107. This piston is located in cylinder 108 and can rotate with shaft 106 relative to the cylinder. The space above the piston in cylinder 108 is connected to cylinders 102a-102d through passageway 106a in shaft 106, vertical port 101a in member 101 and lateral ports 109a-109d. The lateral ports are located in the walls of the cylinders far enough below the inlet ports for only the ports in the cylinders whose piston are forced down by pressure fluid to be exposed and placed in communication with the cylinder. Thus, as shown in FIG. 14, piston 103a had been forced downwardly by a pressure signal entering cylinder 102a through passageway 100a. The piston and rod 104a have caused swash plate 105 to orient shaft 106 and piston 107 connected to it in the desired position. Now port 109a is in communication with the pressure fluid in cylinder 102a. This pressure fluid will travel down through passageway 106a and enter the space above piston 107 in cylinder 108.

Piston 107 has bore 109 in its lower end. The centerline of the bore is skewed or canted from the vertical centerline of the piston and cylinder 108. Located in skewed bore 109 is cylinder block 110 that can slide relative to bore 109. Block 110 is pivotally connected to rod 111, which is mounted for universal pivotal movement by ball and socket joint 112. The ball and socket joint is supported by lateral arms 113 that extend from bit sub 114 positioned just above drill bit 115. Below the ball and socket joint, the rod extends into annular collar 116. Ball 117 is attached to the end of the rod and located in the collar to act as bearing between the rod and the collar. Extending radially from collar 116 are arms 118a–118c. These arms extend through lateral openings 119 in bit sub 114 and are connected to rollers 120a–120c.

In operation, swash plate 105, shaft 106, and piston 107 are positioned in response to pressure signals through one or two of passageways 102a–102d. Downward movement of piston 107 due to the pressure fluid supplied from the cylinders will impose a lateral force on block 110 tending to move the lower end of rod 11 laterally in the opposite direction, as the rod pivots in ball and socket joint 112. This lateral force will be transmitted sequentially to rollers 120a–120c as the drill pipe rotates and the rollers will in turn exert a lateral force against wall 121 of the well bore and urge the bit to move in the desired direction. Coil spring 122 will urge piston 107 upwardly to a neutral position with rod 111 vertical when there is no pressure being supplied to cylinder 108. This will be the case, when no pressure signal is being supplied by the directional drilling apparatus of the invention.

FIGS. 17A and 17B are vertical sections through another embodiment of apparatus for imposing the lateral force on the bit in response to the pressure signals produced by the apparatus. In this embodiment, the pressure signals, "up", "down", "right", and "left", are connected directly to four cylinders, 130a–130d, through passageways 131a–131d. As shown in the drawings, only cylinders 130a and 130c and their associated pressure signal passageways are shown. It will be understood that there are two more cylinders, all four of which are spaced radially 90° from each other, equidistant from the center of housing member 132.

In this embodiment, in the same manner as described above in connection with the embodiment of FIGS. 14–16, pistons 133a–133d have piston rods 134a–134d that exert downward forces on swash plate 135 in response to pressure signals from the inclination and azimuthal sensing apparatus located in the drill pipe above. This orients shaft 136, which is mounted for rotation on bearing 137.

Shaft 136 extends into central opening 138 of piston 139. The piston has an upward tubular extension 140, which is connected to shaft 136 by a splined connection so that rotation of the shaft will be imparted to the piston yet they can move axially relative to each other. The piston is located in cylinder 141 and pressure fluid from the pressure signal passageways 131a–131d is supplied to the cylinder above piston 139 through passageway 142 in the shaft and passageway 143 in the central position of housing member 132. Four lateral ports connect passageway 143 with each of cylinders 130a–130d.

As shown in FIG. 17a, piston 133c has been moved downwardly by pressure introduced into cylinder 130c through pressure signal passageway 131c. This downward force acting on swash plate 135 has oriented shaft 136 and piston 139 as shown. The pressure fluid is now able to enter the space above the piston in cylinder 141. The pressure fluid from central passageway 142 in the shaft flows upwardly into the cylinder through ports 144 in the piston. Piston 139 then will be urged downwardly. Integrally attached to piston 139 is cam guide member 145. This member has an inclined guide slot 146 in which cam member 147 is slidably mounted. The cam member is pivotally connected through pin 148 to swivel member 149, which is rotatably mounted in the upper end of bit sub 150. Boot 151 is connected to the lower end of instrument housing 152 of the apparatus and rotates with it and the drill pipe and provides a seal between the upper end of bit sub 150 and instrument housing 152. Inner housing 132 is maintained substantially stationary along with the signal producing apparatus in the housing.

Bit sub 150 is connected to drill pipe 153 by a universal connection that allows the bit sub to pivot a limited amount in any direction relative to the drill pipe. The universal connection shown in FIG. 17B includes annular ring 154 that is connected to the lower end of drill pipe 153 through two circular ears 155 that engage circular slots 156 in ring 154. Bit sub 150, in turn, is connected by a similar arrangement of circular ears 157 and slots 158 in ring 154. This type of connection between the bit sub and drill pipe allows the bit sub to pivot to a limited extent in any direction relative to the drill pipe.

In operation then, as piston 139 is forced down, inclined slot 146 [and] *will move downwardly relative to* cam member 147 [will move upwardly along the slot] and in doing so will exert a force to the right on swivel 149, as viewed in FIG. 17a. This force will be transmitted to bit sub 150 through the swivel member and move the bit out of axial alignment with the drill pipe causing it to drill in the direction to return the well bore to the desired inclination or azimuthal direction. Drilling fluid can flow through the drill pipe and out the bit by passing through lateral ports 161 in the bit sub located below the swivel connection between the bit sub and swivel member 149. The bit sub is hollow below ports 161 and the drilling fluid can flow downwardly and out of the pipe through ports 162 in bit 160. Pressure energized seal ring 161a keeps the drilling mud from escaping from between the bit sub and the lower end of the drill pipe.

FIG. 20 is an alternate connection between the lower end of the piston and the swivel. Here link member 163 is pivotally connected at each end to cam member 145' and to the top of the swivel member 149' by pins 165 and 166, respectively. Downward movement of the piston and cam member 145 will exert a lateral force on the top of swivel member 149', which is transmitted to bit sub 150' and to the bit.

FIG. 21 is an alternate arrangement for the universal connection between the bit sub and the drill pipe. In this embodiment bit sub 170, has central portion 171 that extends up and is connected to the swivel (not shown). The bit sub here is integrally connected to drill pipe 171 and is actually formed from the same piece. To provide the required movement of the sub relative to the drill pipe, helical groove 172 is cut through the wall of the drill pipe to form coils 173 of a coil spring. The space between the coils and on the outside and inside thereof is filled with sealer 174, preferably an elastomer such as rubber that can be compressed and stretched as the coil spring is bent due to a lateral force imposed on the bit sub.

Figure 18A:
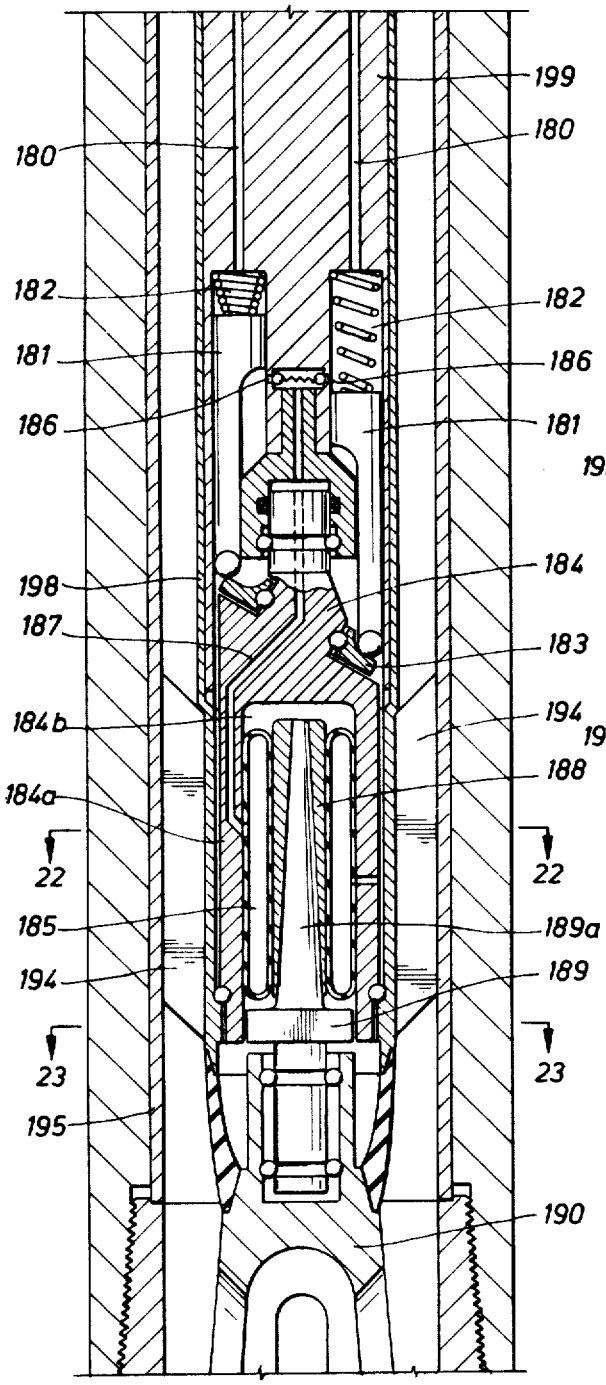
FIGS. 18A and 18B are another embodiment of apparatus for imposing a lateral force on the drill bit.
Figure 18B:
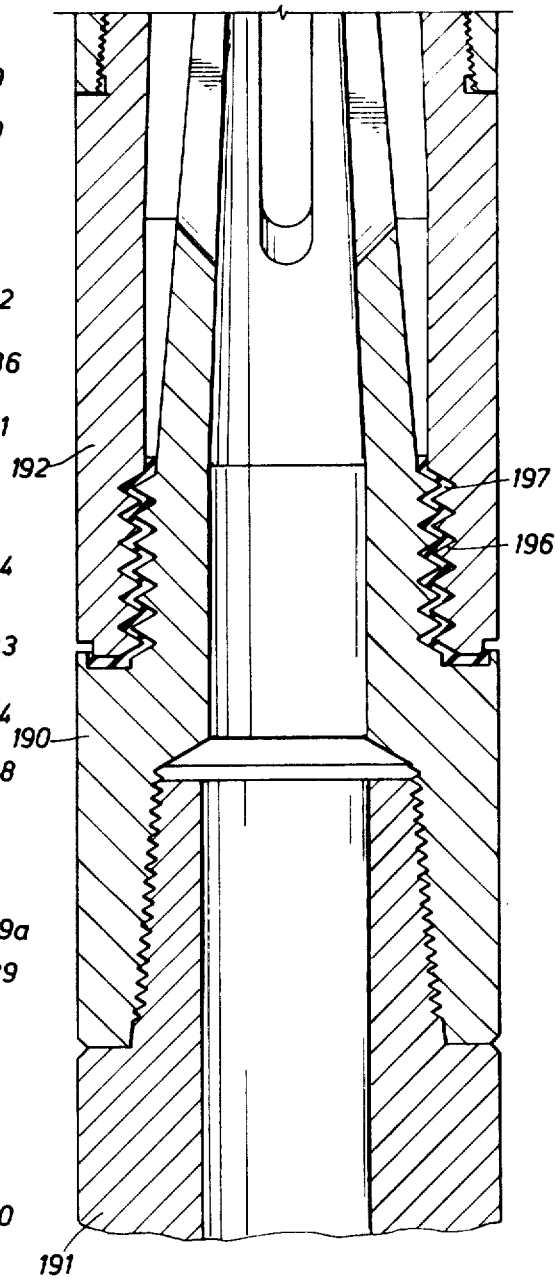

FIGS. 18A and 18B show another embodiment of the apparatus for imposing a lateral force on the bit in response to fluid pressure signals produced by corrective signals from the apparatus of this invention. In this embodiment, the fluid pressure signals travel through passageways 180 and exert a downward force on one of pistons 181 in cylinders 182. (As before there are four of each if all of the corrective signals are required. If only one of the sensing devices is used, two of each would be sufficient.) This embodiment in the same way as described above in connection with the other embodiments positions swash plate 183 and shaft 184 with the desired orientation to produce the lateral force for the desired correction. In this embodiment, the force producing arrangement comprises bladder 185. This bladder is made of a flexible material and is connected to cylinders 182 so that the particular cylinder or cylinders supplied with pressure will also provide pressure fluid to the inside of bladder 185 after the pistons have moved far enough down to orient the swash plate at which time lateral ports 186 will be uncovered. These ports are connected through check valves to passageway 187, which extends through shaft 184 and bladder housing 184a integrally connected thereto. At its lower end the passageway is connected to bladder 185. As the bladder is inflated with pressure fluid, it exerts a lateral force on member 188 which is positioned on upper end 189a of swivel member 189. Member 188 is rectangular in cross section as is bladder cavity 184b so the member and bladder 185 will rotate with the bladder housing and shaft and be oriented properly. Once oriented pressure in bladder 185 exerts a lateral force on the swivel member which in turn is transmitted to the upper end of bit sub 190 and hence to bit 191. Movement of bit sub 190 relative to drill pipe 192 is accomplished in the embodiment shown by using a connection between the bit sub and the drill pipe where clearance is provided between threads 196 with the clearance filled with resilient material 197, such as rubber.

Vertical guide ribs 194 and sleeve 195 support apparatus housing 198 in the center of the drill pipe for rotation with the drill pipe. The pistons, bladders, etc., are connected to the pendulum housing through connecting member 199 and is non-rotative relative to the earth or earth oriented. Here as in the previous embodiment, the lateral force causes the bit sub and bit to move out of alignment with the drill pipe into a preferred axis in the direction it is desired for the hole to take. This is in effect "slewing" the bit to cause it to drill in the desired direction.

In the above described embodiments, the drill pipe rotated the drill bit and therefore rotated at the same speed as the bit. When a downhole motor, such as a turbodrill, rotates the bit the drill pipe need not rotate. Usually, however, it is deemed desirable to rotate the drill pipe, even though not required, to reduce the danger of the pipe becoming stuck by a pressure differential between the hydrostatic pressure of the drilling fluid and a formation pressure. Even if the drill pipe is not rotated at the surface the reaction torque imposed on the drill pipe by the drilling motor will cause a varying amount of wind-up of the pipe, particularly with long strings of drill pipe. Therefore, the means for rotating the inclinometer and azimuth sensing means at the speed of rotation of the drill pipe and in the opposite direction is still important to the proper functioning of the directional drilling apparatus of this invention. In FIGS. 24–26, the apparatus is adapted for use with a downhole motor. The apparatus is located in housing 200, which is positioned in the drill pipe above downhole motor 201. This motor rotates drill bit 202. In the embodiment shown, the apparatus in housing 200 includes means for orienting a shaft in response to the signals from the apparatus. An arrangement such as shown in FIGS. 17A and 17B or FIGS. 18A and 18B, could be used, for example. The apparatus then orients shaft 203 in response to the signals from the inclination and azimuthal sensing means. This shaft is eccentrically mounted with respect to the longitudinal axis of drill pipe 204. Valve rods 205a–205d extend radially through the wall of housing 200. They are spaced 90° apart. Attached to the outer end of each rod are valve elements 206a–206d. The valve elements close lateral ports 207a–207d, respectively, when they are in engagement with the inner wall of the drill pipe. Coil springs 208 are located on each rod, between the inside of housing 200 and the enlarged ends of the rods to urge the rods away from the drill pipe and toward eccentric shaft 203. With the shaft positioned off center, as the housing and drill pipe rotate relative to the shaft, each rod will move its valve element away from the drill pipe and allow drilling fluid in annulus 209 to flow into the opened port. For example, in FIG. 25, port 207b is open and receiving drilling fluid. As the drill pipe rotates another 90° in a clockwise direction, port 207a will be opened and 207b will be closed. Rotation in the other direction would next open port 207c.

Each port connects to a pressure energized force transmitting device located between the drill pipe and the wall of the well bore to exert a lateral force on the drill pipe adjacent the bit. In the embodiment shown, four inflatable bladders 210a–210d of resilient material, such as rubber, are positioned circumferentially around the drill pipe. As shown the bladders are integrally connected together, each bladder consisting of an opening in annular body 211 of resilient material.

Annular body 211 is located between drill pipe 204 and outer tubular member 212, which is made of a relatively rigid material such as steel, and bonded to the annular body of resilient material. Drilling fluid flows into each of bladders 210 sequentially as the drill pipe is rotated and ports 207 are opened successively. The pressure of the drilling fluid in the bladder exerts a lateral force on housing 215 of the downhole motor and on the well bore through spaced vertical ribs 213. The force on the downhole motor housing is transmitted directly to the bit. This lateral force is oriented by the position of eccentric shaft 203 to direct the force in the desired direction. As each port is closed, the drilling fluid in the bladder to which the port is connected drains out of the bladder through openings 214a–214d. These openings are sized so they are small enough to allow fluid out at a lower rate than it enters the bladder so it will be enlarged by the drilling fluid; but they are large enough to allow the fluid to exhaust from the bladder fast enough not to interfere with the proper location of the lateral force. The drilling fluid is exhausted on the outside of the drill pipe, which is at a lower pressure than the fluid in annulus 209.

As stated above, it is one of the objects of this invention to provide directional drilling apparatus that will urge the drill bit to drill either at a preselected angle or preselected azimuthal direction. In addition, the apparatus can be adjusted to provide a continuous corrective signal of a given type.

For example, in FIG. 27 the apparatus has been adapted to control inclination only. All of the parts remain the same as in the embodiment shown in FIG. 5 with one exception, so they have been assigned the same numbers in this figure. The new part of the combination is member 220, which replaces north seeking member 65. This member is not needed for inclination only, however, means are needed to keep the pendulum positioned to swing toward the low side of the hole. In the embodiment shown, member 220 has mass 220a positioned on one side of its axis of rotation around bearing sleeve 67. Instead of seeking the north, it will rotate to position mass 220a on the low side of the hole. This will cause valve 63 to hold stator 62a in position for the longitudinal axis of shaft 73 to point toward the low side of the hole, which will position pendulum 70 in the proper plane to control the inclination of the hole.

If pacing motor 62 holds the pendulum shaft in the proper orientation, no signals will be produced by control valve 76. Since it is unlikely that the pacing motor can hold the shaft that still, the azimuthal signal producing members are preferably de-activated. This can be done simply by plugging their associated output ports with, for example, a removable pipe plug.

It may be desirable to provide a continuous control signal. For example, it may be desired to cause a well bore to continuously increase its inclination in a given direction. This can be done in several ways. For example, shaft 71 or shaft 73 could be locked in position to give the desired corrective signal continuously. Set screws could be used for this purpose. Also, this can be done by locking the spool of the control valve concerned, such as spool 80, for inclination. FIGS. 29 and 30 illustrate apparatus for doing this. In FIG. 29, set screw 222 is positioned in tapped hole 224 in the wall of the valve body. It can be positioned to hold the spool to provide a continuous corrective signal. It can hold the spool only from moving to the right, however. So for the other signal, the spool has tapped hole 226 which is engaged by threaded member or bolt 228. The diameter of the threaded portion of member 228 is small enough to extend through tapped hole 224. Rotation of member 228, as by an Allen wrench, will pull the spool to the right, as viewed in FIG. 30, and hold it in position to provide a continuous corrective signal. Enlarged heads 230 and 232 of set screw 222 and bolt 228, respectively, carry seal rings 234 to isolate the inside of the valve body from the outside.

From the foregoing description of one embodiment of this invention by way of example, it will be seen that this invention is one well adapted to attain all of the ends and objects hereinabove set forth, together with other advantages which are obvious and which are inherent to the apparatus and structure.

The invention having been described, what is claimed is:

1. Apparatus for urging a drill bit connected to a drill string to drill through the earth in a preselected azimuthal direction comprising azimuthal direction sensing means located in the drill string, means responsive to the azimuthal direction sensing means when the azimuthal direction of the pipe string varies from the preselected direction for exerting a lateral force on the drill bit to urge the drill bit to drill in a direction that will return the drill string to the preselected azimuthal direction, and means for rotating the azimuthal direction sensing means relative to the drill string at approximately the speed of rotation of the drill string and in the opposite direction to hold the sensing means substantially non-rotative relative to the earth.

2. The apparatus of claim 1 in which the azimuthal direction sensing means includes a north seeking element.

3. The apparatus of claim 1 [further] in which the azimuthal direction sensing means includes means for sensing the inclination from the vertical of the drill string and means responsive to said inclination sensing means for exerting a lateral force on the drill bit, when the inclination of the pipe string varies from a preselected angle to urge the drill bit to drill in a direction that will return the drill string to the preselected angle.

4. The apparatus of claim 3 in which the inclination sensing means includes a vertical seeking member that makes an angle with the drill string substantially equal to the angle the drill string makes with the vertical.

5. The apparatus of claim 4 in which the azimuth sensing means includes a north seeking element and said inclination sensing means include a pendulum, means providing a universal connection between the north seeking element and the pendulum to permit the pendulum to seek a vertical position and energize the lateral force producing means when the inclination of the drill pipe and its azimuthal direction vary from said preselected values.

6. The apparatus of claim 5 in which said lateral force producing means for urging the drill bit to drill in the desired direction includes means for providing correction signals in response to the position of the pendulum to energize lateral force producing means to urge the bit either upward, or downward, and to the left or to the right as required to direct the bit through the earth at the preselected inclination and azimuthal direction.

7. The apparatus of claim 5 in which the lateral force producing means urges the bit to move out of axial alignment with the drill string to cause the bit to drill in the desired direction.

8. The apparatus of claim 1 further provided with means providing a continuous lateral force adjacent the drill bit urging the drill bit to change its inclination as it bores through the earth.

9. Apparatus for urging a drill bit connected to a drill string to follow a given angle from the vertical comprising, inclination sensing means located in the drill string to sense the angle the drill string makes with the vertical, means responsive to the inclination of the drill string to exert a lateral force on the drill bit, when the inclination is different from a preselected angle, to urge the bit to drill in a direction that will return the drill string to the preselected angle, and means for rotating the inclination sensing means at approximately the speed of rotation of the drill string and in the opposite direction to keep the sensing means substantially non-rotative relative to the earth.

10. Apparatus for urging a drill bit connected to a drill string to follow a given angle from the vertical comprising, inclination sensing means located in the drill string having a vertical seeking member that makes an angle with the drill string substantially equal to the angle the drill string makes with the vertical, means responsive to the angle the drill string makes with the vertical seeking member for exerting a lateral force on the drill bit, when the angle is different from a preselected angle, to urge the bit to drill in a direction that will return the drill string to the preselected angle, and means for rotating the inclination sensing means at approximately the speed of rotation of the drill string and in the opposite direction to keep the sensing means substantially non-rotative relative to the earth.

11. The apparatus of claim 10 in which the inclination sensing means also includes means for sensing the azimuthal direction the well bore is taking as it is being drilled and in which said force applying means applies a lateral force on the drill bit in response to said azimuthal sensing means to urge the drill bit to maintain a prescribed azimuth as it drills through the earth.

12. The apparatus of claim 10 in which the means for rotating the sensing means includes a fluid motor having a stator and a rotor, the rotor being attached to the drill string for rotation therewith, a source of pressure fluid for rotating the stator relative to the rotor in a direction opposite to the direction of rotation of the drill string, means responsive to rotation controlling the supply of pressurized fluid to the motor to rotate the stator at approximately the speed of rotation of the drill string to cause the stator to be substantially non-rotative relative to the earth, and means connecting the sensing means to the stator.

13. The apparatus of claim 12 in which the pressure fluid controlling means includes a gyroscope connected to the stator and valve means responsive to forces exerted by the gyroscope, when rotated, to control the flow of pressure fluid to the fluid motor.

14. The apparatus of claim 13 in which the wheel of the gyroscope is rotated by a stream of the pressure fluid directed against the wheel.

15. The apparatus of claim 12 in which the azimuth sensing means includes a magnetic compass having a magnetic north seeking element.

16. The apparatus of claim 15 further provided with a second fluid motor having a stator and a rotor, said second motor being mounted with its rotor connected to the stator of the first motor and its stator connected to the north seeking element of the compass, means supplying said second motor with pressure fluid to rotate its stator in a direction opposite the direction of rotation of its rotor and means, responsive to relative movement between the stator and the magnetic north seeking element, controlling the flow of pressure fluid to said second motor to cause the stator to rotate at approximately the same speed as the rotor is rotated by the stator of the first motor and in the opposite direction so the stator is substantially non-rotative relative to the earth and the magnetic north seeking element.

17. The apparatus of claim 10 in which the vertical seeking member of the inclination sensing means comprises a pendulum pivotally mounted to freely seek a vertical hanging position.

18. The apparatus of claim 11 in which the azimuth and angle sensing means includes a magnetic compass having a magnetic north seeking element, a pendulum, means mounting the pendulum for pivotal movement in all directions, means responsive to the position of the pendulum to provide a corrective force when the pendulum is not positioned in a preselected azimuth plane and to provide a corrective force when the pendulum is not at a preselected angle of inclination from the vertical and to provide a zero corrective force when the pendulum is positioned in said preselected azimuthal plane and at said preselected angle of inclination, and means connecting the pendulum mounting means to the north seeking element including means permitting the mounting means to be adjusted to position the pendulum to provide said corrective forces.

19. The apparatus of claim 10 in which the means providing said lateral force on the drill bit includes a tubular sleeve, means mounting the sleeve on the drill string above the drill bit for limited lateral movement relative to the drill pipe, a plurality of fluid operated force transmitting members positioned circumferentially around the drill string between the sleeve and the drill string and means for sequentially supplying said members with pressure fluid to cause said members to exert a lateral force on the drill string to urge the drill bit to drill through the earth in the desired direction.

20. The apparatus of claim 19 in which the force transmitting members are inflatable bladders of flexible material.

21. The apparatus of claim 19 in which said force providing means includes pressure signal passageways, valve means responsive to inclination of said sensing means for controlling the flow of pressure fluid to said pressure signal passageways, said passageways having outlet ports the same radial distance from the longitudinal axis of the drill pipe, a signal distributor member attached to the drill pipe for rotation therewith, said member having conduits therein with inlet ports the same radial distance from the axis of the drill pipe as the outlet ports of the first mentioned passageways, said member being positioned so the inlet ports of the conduits will move past the outlet ports each revolution of the drill pipe to pressurize each of said conduits as its port passes by the outlet ports of the pressure signal passageways that are being supplied with pressure fluid by said valve means, and means responsive to fluid pressure in said conduits for actuating the fluid operated force transmitting members.

22. The apparatus of claim 18 in which said means of providing a corrective force includes pressure signal passageways, valve means actuated by the pendulum to pressurize the proper pressure signal passageways, and means responsive to the pressure signal in said passageways to exert the desired corrective lateral force on said drill bit.

23. The apparatus of claim 22 in which said lateral force exerting means includes a bit sub connecting the drill bit to the drill string, means providing a universal connection between the bit sub and the drill string and means for urging the bit sub to pivot in one direction to move the axis of rotation of the bit out of alignment with the axis of rotation of the drill pipe to urge the bit to drill in a direction that will return the drill string to the desired azimuthal direction and inclination.

24. The apparatus of claim 23 in which the lateral force exerting means includes a plurality of orienting cylinders each connected to one of said pressure signal passgeways, a piston in each cylinder with a rod attached thereto and extending out of said cylinder, a shaft mounted for rotation with a swash plate attached to the shaft at an angle and positioned to be engaged by each rod for downward movement of a rod to cause the swash plate to rotate to position its low side under the downwardly moving rod and thereby rotate the shaft to the desired orientation, a power cylinder having a piston therein slidably connected to the shaft for rotation thereby as the swash plate orients the shaft, means supplying said cylinder with fluid pressure to move said piston downwardly, means actuated by the downwardly moving piston for exerting a lateral force on the bit sub to move the drill bit out of axial alignment with the drill string in the direction to cause the bit to tend to drill in a direction that will return the drill string to the desired preselected inclination and azimuthal direction.

25. The apparatus of claim 10 further provided with means providing a continuous lateral force adjacent the drill bit urging the drill bit to change its azimuthal direction as it bores through the earth.

*26. Apparatus for directionally drilling a well bore comprising a drill string extending into the well bore, a drill bit, means connecting the drill bit to the drill string to transmit rotation of the drill string to the drill bit and to allow limited universal pivotal movement of the bit around an axis perpendicular to the longitudinal axis of the drill string, including a bit sub having an upper portion extending above the universal connection into the drill string, means for sensing the inclination of the drill string adjacent the bit, and means responsive to the sensing means for urging the bit to pivot in the desired direction around said axis to change the direction of the well bore, said urging means including a piston mounted in the drill string adjacent the upper portion of the bit sub for rotation relative to the drill string and for axial movement along the longitudinal axis of the drill string toward and away from said upper portion for rotation relative thereto, a cam follower connected to the swivel member, a cam surface on the piston engaging the cam follower to pivot the sub and bit around said axis when the piston is moved axially along the longitudinal axis of the drill string, and means responsive to the sensing means to position the piston to pivot the sub and bit in the desired direction and to move the piston to so pivot the sub and bit.*

* * * * *